(12) United States Patent
Von Lehmann

(10) Patent No.: US 12,065,216 B2
(45) Date of Patent: Aug. 20, 2024

(54) TORQUE TRANSISTOR AND E-BIKE WITH TORQUE TRANSISTOR

(71) Applicant: MAXON INTERNATIONAL AG, Sachseln (CH)

(72) Inventor: Ernst Von Lehmann, Glottertal (DE)

(73) Assignee: MAXON INTERNATIONAL AG, Sachseln (CH)

( * ) Notice: Subject to any disclaimer, the term of this patent is extended or adjusted under 35 U.S.C. 154(b) by 521 days.

(21) Appl. No.: 17/593,884

(22) PCT Filed: Apr. 2, 2020

(86) PCT No.: PCT/EP2020/059412
§ 371 (c)(1),
(2) Date: Sep. 27, 2021

(87) PCT Pub. No.: WO2020/207900
PCT Pub. Date: Oct. 15, 2020

(65) Prior Publication Data
US 2022/0169335 A1 Jun. 2, 2022

(30) Foreign Application Priority Data
Apr. 12, 2019 (EP) ..................... 19168972

(51) Int. Cl.
*B62M 6/55* (2010.01)
*F16D 41/064* (2006.01)
(Continued)

(52) U.S. Cl.
CPC ............. *B62M 6/55* (2013.01); *F16D 41/064* (2013.01); *F16D 41/088* (2013.01); *F16D 41/28* (2013.01)

(58) Field of Classification Search
CPC . B62M 6/55; B62M 6/45; B62M 6/60; B62M 6/65; F16D 41/064; F16D 41/066;
(Continued)

(56) References Cited

U.S. PATENT DOCUMENTS 6,276,479 B1  8/2001  Suzuki et al.
7,040,440 B2  5/2006  Kurita et al.
(Continued)

FOREIGN PATENT DOCUMENTS

CN  1530285 A  9/2004
CN  106604863 A  4/2017
(Continued)

OTHER PUBLICATIONS

International Search Report (PCT/ISA/210) with English translation and Written Opinion (PCT/ISA/237) mailed on Jun. 19, 2020, by the European Patent Office as the International Searching Authority for International Application No. PCT/EP2020/059412.
(Continued)

*Primary Examiner* — Timothy Hannon
(74) *Attorney, Agent, or Firm* — Buchanan Ingersoll & Rooney PC

(57) ABSTRACT

A torque-transmitting arrangement for the drive train of a muscle-power-operated vehicle with auxiliary motor includes an output shaft, a first input shaft for the transmission of a torque generated by muscle power to the output shaft, a second input shaft for the transmission of a torque generated by the auxiliary motor to the output shaft, and a freewheel function, which prevents a user from having to concomitantly rotate the auxiliary motor when the auxiliary motor is inactive. A mechanical clutch transmits a torque from the second input shaft to the output shaft if, at the first input shaft, a torque prevails which acts in a drive direction of rotation on the output shaft, and transmits no torque from
(Continued)

Figure 1:
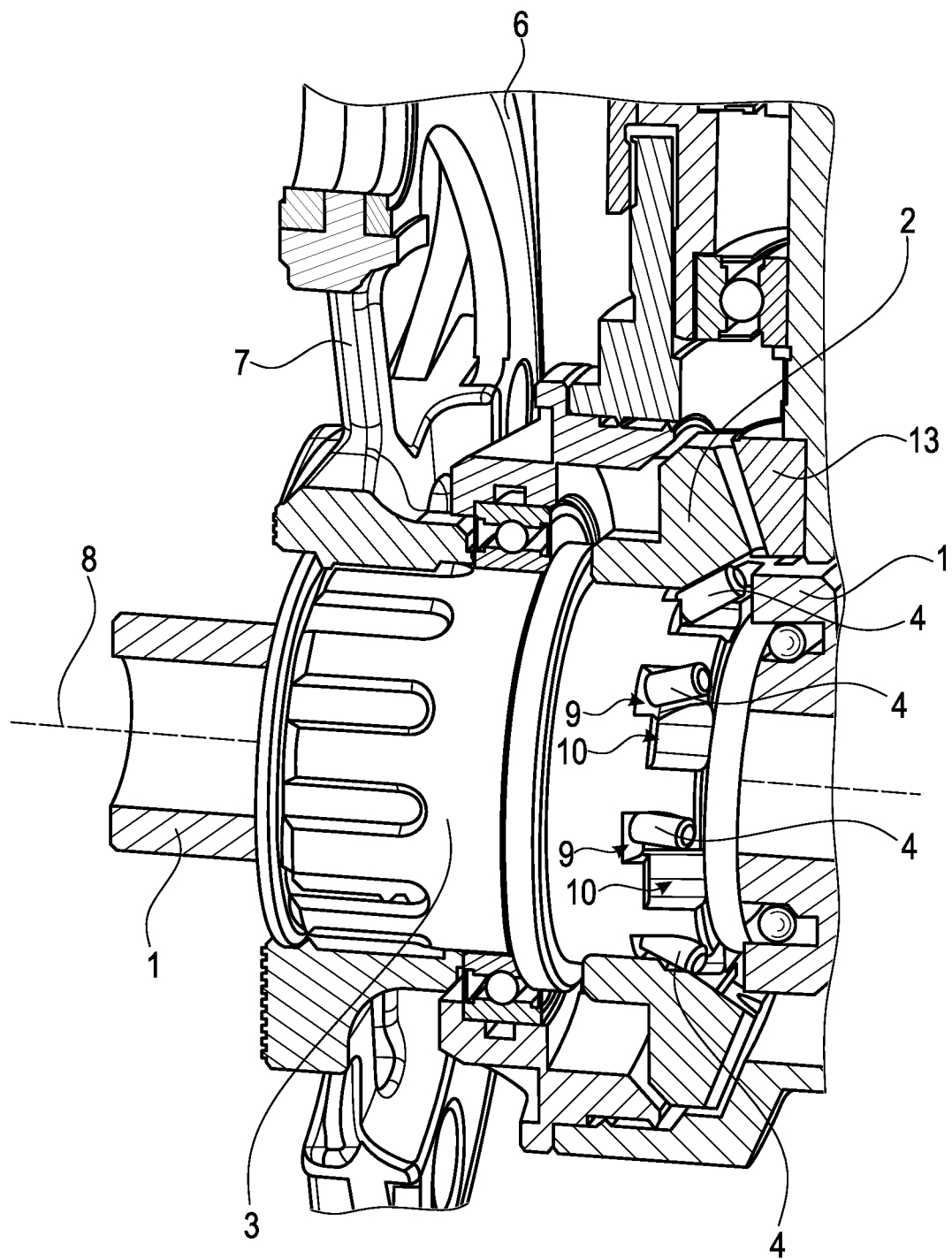

the second input shaft to the output shaft if, at the first input shaft, a torque prevails which acts on the output shaft counter to the drive direction of rotation.

20 Claims, 7 Drawing Sheets

(51) Int. Cl.
  *F16D 41/08* (2006.01)
  *F16D 41/28* (2006.01)
(58) Field of Classification Search
  CPC ...... F16D 41/088; F16D 41/105; F16D 41/24; F16D 41/26; F16D 41/28
  See application file for complete search history.

(56) References Cited

U.S. PATENT DOCUMENTS

| | | | | |
|---|---|---|---|---|
| 2004/0231905 | A1* | 11/2004 | Kurita | B60L 15/2009 180/206.7 |
| 2013/0092493 | A1 | 4/2013 | Hsueh | |
| 2017/0356508 | A1 | 12/2017 | Usami | |
| 2020/0086947 | A1* | 3/2020 | Doeppner | B62M 11/02 |
| 2020/0391822 | A1* | 12/2020 | Edwards | B62M 9/122 |

FOREIGN PATENT DOCUMENTS

| | | |
|---|---|---|
| EP | 0700826 A1 | 3/1996 |
| EP | 3187407 A1 | 7/2017 |
| EP | 3254945 A1 | 12/2017 |
| JP | 2017047731 A | 3/2017 |
| JP | 2017218104 A | 12/2017 |
| JP | 2018158695 A | 10/2018 |
| WO | 2013007230 A1 | 1/2013 |

OTHER PUBLICATIONS

Office Action issued on Oct. 17, 2023, by the Japanese Patent Office in corresponding Japanese Patent Application No. 2021-560115, and a machine English Translation of the Office Action. (12 pages).
Notice on the First Office Action issued on Jul. 29, 2022, by the Chinese Patent Office in corresponding Chinese Patent Application No. 202080026288.3, and an English Translation of the Office Action. (26 pages).

* cited by examiner

TORQUE TRANSISTOR AND E-BIKE WITH TORQUE TRANSISTOR

The present invention relates to a torque-transmitting arrangement for the drive train of a muscle-power-operated vehicle with auxiliary motor according to the preamble of independent claim 1. Within the scope of the present application, the term "muscle-power-operated vehicle" principally includes all types of muscle-power-operated vehicles, in particular water vehicles, such as pedal boats, or the like. The present invention, however, is in particular suited for e-bikes or pedelecs with a mid-motor or bottom bracket motor.

A generic torque-transmitting arrangement according to the preamble of independent claim 1 comprises an output shaft, a first input shaft for the transmission of a torque generated by muscle power to the output shaft, a second input shaft for the transmission of a torque generated by the auxiliary motor to the output shaft, and a freewheel function, which prevents a user of the muscle-power-operated vehicle from having to concomitantly rotate the auxiliary motor when the auxiliary motor is inactive or not switched on.

Generic torque-transmitting arrangements are known from prior art and are employed, for example, in e-bikes with a mid-motor. EP 700 826 A1 discloses such a bike with an auxiliary motor and a control unit on the basis of the detected muscle-operated torque. In the solutions known from prior art, electric sensors detect whether the cyclist exerts a pressure onto the pedal for moving the bike forward. If this pressure is exerted onto the pedal, the auxiliary motor is activated to support the cyclist. If the cyclist does no longer exert any pressure onto the pedal, or rotates the pedal into the opposite direction, this is also detected by electric sensors, and the support of the auxiliary motor is reduced or inactivated. Electric systems are prone to errors and faults and therefore have to be redundant in particular in safety-relevant areas, so that, for example, a safe braking of the bike is possible even in case of a sensor fault. Furthermore, the output shaft, which supports the chain ring, is usually firmly connected to the first input shaft, or it is formed by the first input shaft. The second input shaft is usually also firmly connected to the output shaft. The freewheel function is usually realized by a freewheel which is installed in the auxiliary motor itself or in a transmission arranged between the auxiliary motor and the output shaft. To prevent the auxiliary motor from having to be concomitantly rotated or having to be rotated backwards during backward pedaling, in the solutions known from prior art, it is necessary to install a further freewheel in addition to the first freewheel. From EP 3 254 945 A1, a further bike with an auxiliary motor is known, wherein a drive unit is controlled by a torque detection unit.

It is the object of the present invention to further develop the generic torque-transmitting arrangement such that a particularly compact and inexpensive construction results and simultaneously, both of the above-mentioned freewheel functions can be ensured. Furthermore, a reliable inactivation of the support power of the auxiliary motor is to be ensured.

The object is achieved by the features of independent claim 1. Accordingly, in a torque-transmitting arrangement according to the preamble of independent claim 1, a solution according to the invention is that the torque-transmitting arrangement comprises a mechanical clutch which is designed to transmit a torque from the second input shaft to the output shaft if, at the first input shaft, a torque prevails which acts in a drive direction of rotation on the output shaft, and to transmit no torque from the second input shaft to the output shaft if, at the first input shaft, a torque prevails which acts on the output shaft counter to the drive direction of rotation.

Advantageous embodiments of the present invention are the subject matter of the subclaims.

In a preferred embodiment of the present invention, the clutch is a mechanical clutch which is operable without any electric power supply. Preferably, the mechanical clutch is designed as a clamp-type lock. Compared to electric systems, a mechanical clutch has a higher reliability. In electric systems, there is a risk in that, for example, a battery or accumulator is empty and the system fails thereby. Furthermore, cable breaks in a sensor or supply lines can lead to system failures. In particular in vehicles which are in most cases employed in external areas, this is a great challenge since these also have to perfectly operate at different temperatures and, for example, in snow and rain over years. Electric systems in the safety and vehicle field therefore have to be designed redundantly two- or even three-fold.

According to a further particularly preferred embodiment of the present invention, the output shaft, the first input shaft, and the second input shaft are arranged coaxially with respect to each other and are principally mounted to be rotatable with respect to each other, wherein between the first input shaft and the output shaft, there is a catching engagement with a clearance which permits a relative rotation between the first input shaft and the output shaft within a certain circumferential clearance, wherein at least one clamping element is arranged like a clamp-type lock between the second input shaft and the output shaft such that the clamping element is in any case in a released position or is brought into the released position if the output shaft is rotated in a drive direction of rotation by the first input shaft, and the second input shaft either does not rotate or rotates more slowly in the drive direction of rotation than the output shaft and the first input shaft, wherein the clamping element is transferred from the released position into a locking position by a relative rotation between the output shaft and the second input shaft, if the second input shaft temporarily rotates faster in the drive direction of rotation than the output shaft, so that a catching engagement between the second input shaft and the output shaft is created, wherein the clamping element in any case remains in the locking position as long as a torque acting in the drive direction of rotation is transmitted to the output shaft via the first input shaft and via the second input shaft, and wherein the first input shaft comprises an unlocking element which moves the clamping element actively from the locking position into the released position in any case if the first input shaft rotates counter to the drive direction of rotation within the circumferential clearance existing between the first input shaft and the output shaft relative to the output shaft. The clutch provided according to the invention is thus closed if the clamping element is in the locking position. As soon as the locking element is in the released position, the clutch provided according to the invention is open.

This embodiment has the advantage that the two above illustrated freewheel functions are integrated within one single function unit. Another advantage is that the torque to be transmitted via the clamping element is restricted to the maximum torque of the auxiliary motor. If two separate freewheels are used, one of the two freewheels would have to be, however, designed for the maximum torque the user of the muscle-power-operated vehicle exerts onto the output shaft. The particularly preferred embodiment thus permits altogether a very compact and light construction.

According to the above-illustrated particularly preferred embodiment, the output shaft, the first input shaft, and the second input shaft are arranged coaxially with respect to each other. If not indicated otherwise, the indications below, such as "in the circumferential direction" etc., refer to the common geometric axis of the output shaft, the first input shaft, and the second input shaft.

According to a further particularly preferred embodiment of the present invention, the clamping element is a rolling element which is arranged between a first clamping surface of the output shaft and a second clamping surface of the second input shaft, wherein the distance between the first clamping surface and the second clamping surface decreases, seen in the circumferential direction, such that in the locking position of the clamping element, there is a self-locking between the clamping element and the first clamping surface and the second clamping surface. The clamping element designed as a rolling element can freely rotate in the released position, but in a relative rotation between the output shaft and the second input shaft, wherein the second input shaft rotates faster in the drive direction of rotation than the output shaft, it is seized by the second clamping surface of the second input shaft and taken along and thereby rolls, in the circumferential direction, along the first clamping surface into the locking position in which the above-mentioned self-locking occurs. In a relative rotation in the reverse direction, the self-locking is cancelled in a simple manner.

Particularly preferably, the clamping element is a clamping roller. Clamping rollers of a cylindrical shape can be easily manufactured and permit the transmission of high torques with a simultaneously compact construction. The clamping element can alternatively also have a conical design, for example. The clamping element can have a circular cross-section in a section perpendicular to the longitudinal axis of the clamping element. According to a preferred embodiment, the clamping element, however, has a circular cross-section with at least one bulging. Particularly preferably, the clamping element has a circular cross-section with two bulgings. The bulging represents a cam surface which optimizes power transmission between the second input shaft and the output shaft. In particular if two bulgings are provided, in the region between the bulgings, a surface results which optimizes power transmission between the second input shaft and the output shaft. Furthermore, by the bulging, the positioning of the clamping element is improved.

Further preferably, an axis of rotation of the clamping element is situated in parallel to a common axis of the output shaft, the first input shaft, and the second input shaft.

According to a further preferred embodiment of the present invention, the first clamping surface and the second clamping surface are formed by conical surfaces, wherein a central radius of the second clamping surface is constant across the total circumference of the second input shaft, and wherein a central radius of the first clamping surface varies seen in the circumferential direction. This embodiment also contributes to a compact construction and a safe function of the clamping mechanism.

According to a further preferred embodiment of the present invention, the clamping element is received in a first recess of the output shaft, wherein the first clamping surface is formed by a partial surface of the first recess. This embodiment contributes to a simple construction of the torque-transmitting arrangement according to the invention and permits an easy positioning of the clamping element.

Here, it is particularly advantageous if a second recess following the first recess, seen in the circumferential direction, is formed in the output shaft, wherein the unlocking element of the first input shaft is a pin which engages into the second recess, wherein in the drive direction of rotation, by the engagement between the pin and the second recess, the catching engagement between the first input shaft and the output shaft is created, and wherein the circumferential clearance between the first input shaft and the output shaft is given by a combined expansion of the first recess and the second recess, seen in the circumferential direction, being larger than a combined expansion of the clamping element and the pin, seen in the circumferential direction. This embodiment contributes to a particularly compact and simple construction. Moreover, in this embodiment, a particularly low number of components is required. By the circumferential clearance, a certain relative movement between the first input shaft and the output shaft can be created. By the relative movement, the clamping element can be moved into the locking position in which a torque is transmitted from the second drive shaft to the output shaft, and into the released position in which no torque is transmitted from the second input shaft to the output shaft.

According to a further particularly preferred embodiment of the present invention, the second input shaft encloses the output shaft coaxially. This embodiment also contributes to a compact construction. Here, it is particularly advantageous if the second input shaft is designed as a crown wheel. The crown wheel can be driven in a simple manner by a pinion of the motor shaft engaging into a corresponding gearing of the crown wheel.

According to a further preferred embodiment of the present invention, the first input shaft extends through the output shaft. This embodiment also contributes to a compact construction.

In a further particularly preferred embodiment of the present invention, the torque-transmitting arrangement comprises a plurality of clamping elements which are arranged distributed in the circumferential direction. By the plurality of clamping elements, particularly high torques can be transmitted via the clamping elements. Advantageously, as many unlocking elements or pinions as clamping elements are provided. Particularly preferably, both the clamping elements and the unlocking elements are arranged uniformly distributed in the circumferential direction. This results in a particularly advantageous power transmission. Thereby, a long service life is also achieved.

In a further preferred embodiment of the present invention, the clamp-type lock comprises an annular tensioning element which is designed to support the clamping elements during the transfer into the locking position. The tensioning element can consist, for example, of an elastic material, such as gum or rubber. However, the tensioning element can also be a worm spring which consists of a finely spiraled wire, wherein the wire is elastic due to the spiraling. The tensioning element supports the clamping elements during the transfer into the locking position in which a torque is transmitted from the second input shaft to the output shaft. By the tensioning element which serves as an elastic element or spring, a force or a torque is exerted onto the clamping elements. The torque supports the clamping bodies in their movements into the locking position. Since the clamping elements are in this embodiment pre-tensioned into the locking position by the tensioning element, a very slight relative movement between the second input shaft and the output shaft is sufficient to generate a frictional contact between the second input shaft and the output shaft. The tensioning element can ensure that all clamping elements are transferred into the locking position. This is in particular advantageous since the grease required for lubrication can lead to the clamping elements remaining adhered in the released position despite the relative movement between the second input shaft and the output shaft and not being transferred into the locking position or not rolling or sliding into the locking position. The tensioning element preferably abuts with its inner circumference against the clamping elements with a tension. However, the tensioning element can also abut with its outer circumference against the clamping elements with a tension. In both cases, the clamping elements further preferably have a support surface which is not circular cylindrical with respect to an axis of the respective clamping element, but forms a cam surface at which the tensioning element abuts such that by the cooperation of the tensioning element and the cam surface, a torque is exerted onto the clamping element. Further preferably, the support surface is embodied at a projection axially protruding from a basic body of the clamping element. Further preferably, the support surface extends through the axis of the clamping element.

The present invention also provides a bike with an auxiliary motor and a torque-transmitting arrangement according to the invention, wherein the auxiliary motor is embodied as a mid-motor and is coupled with the second input shaft.

Embodiments of the present invention will be illustrated more in detail below with reference to drawings.

Figure 2:
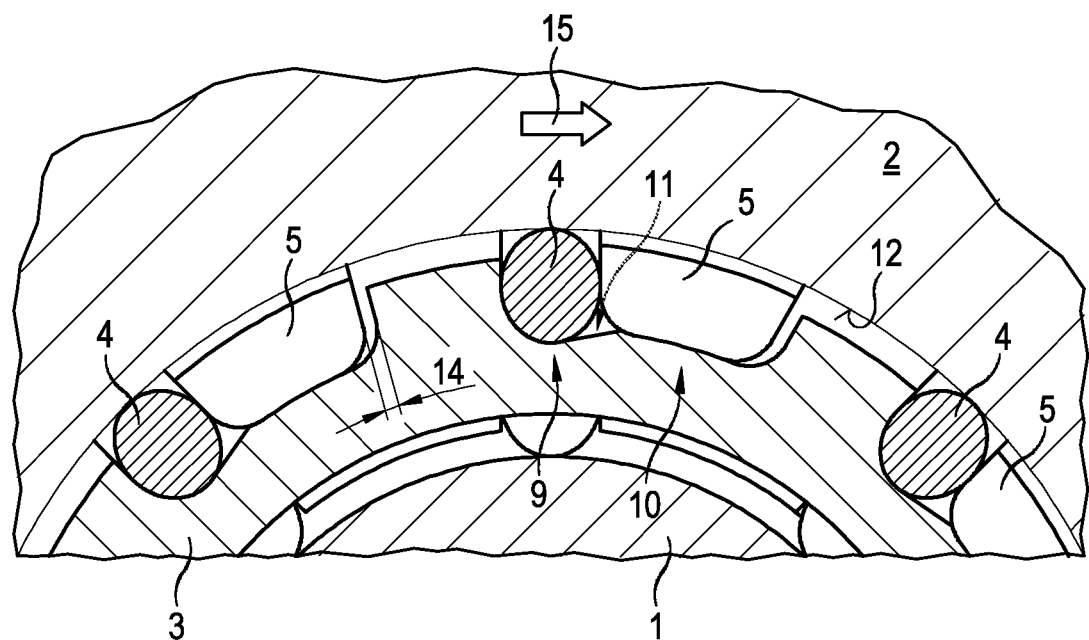
Figure 3:
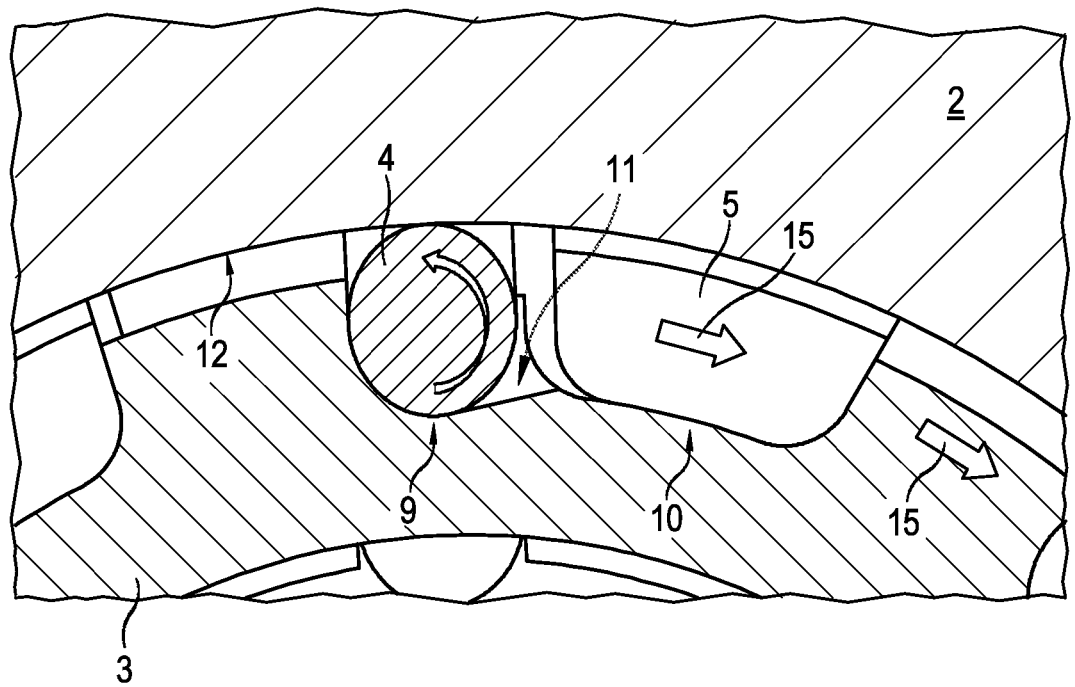
Figure 4:
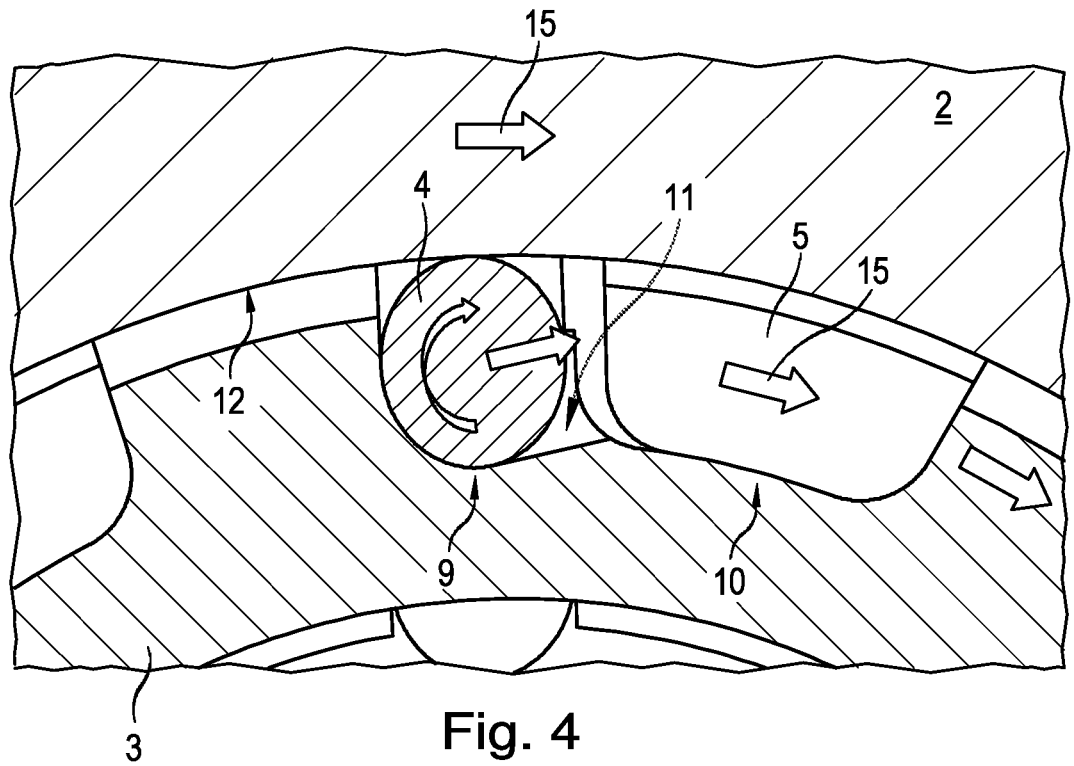
Figure 5:
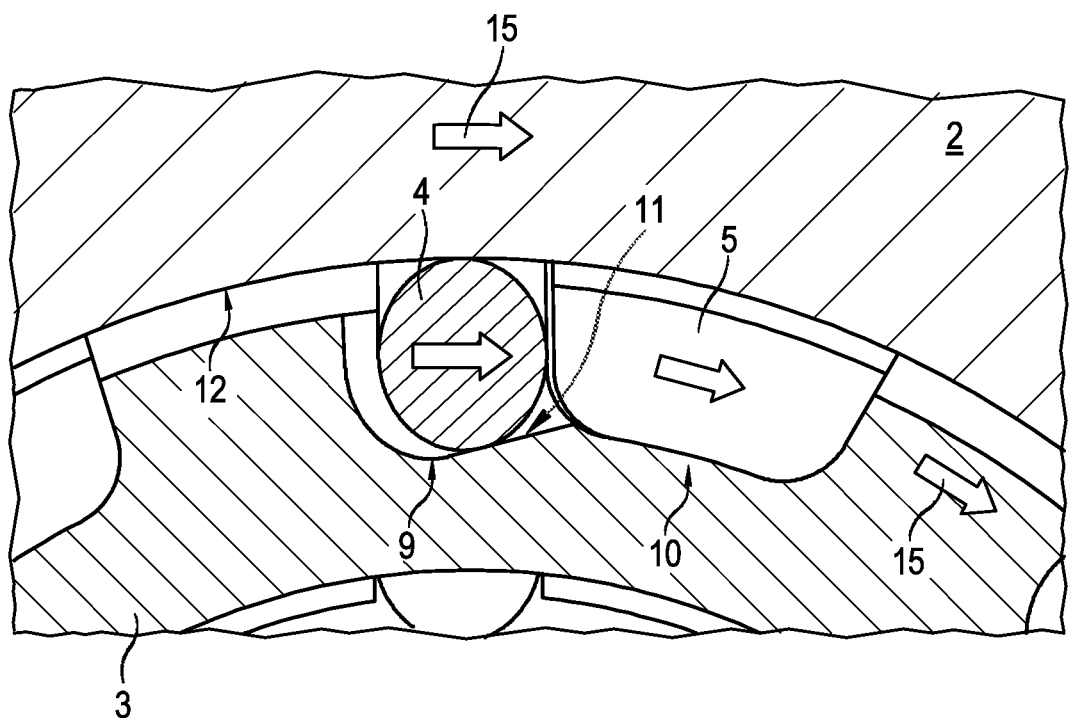
Figure 6:
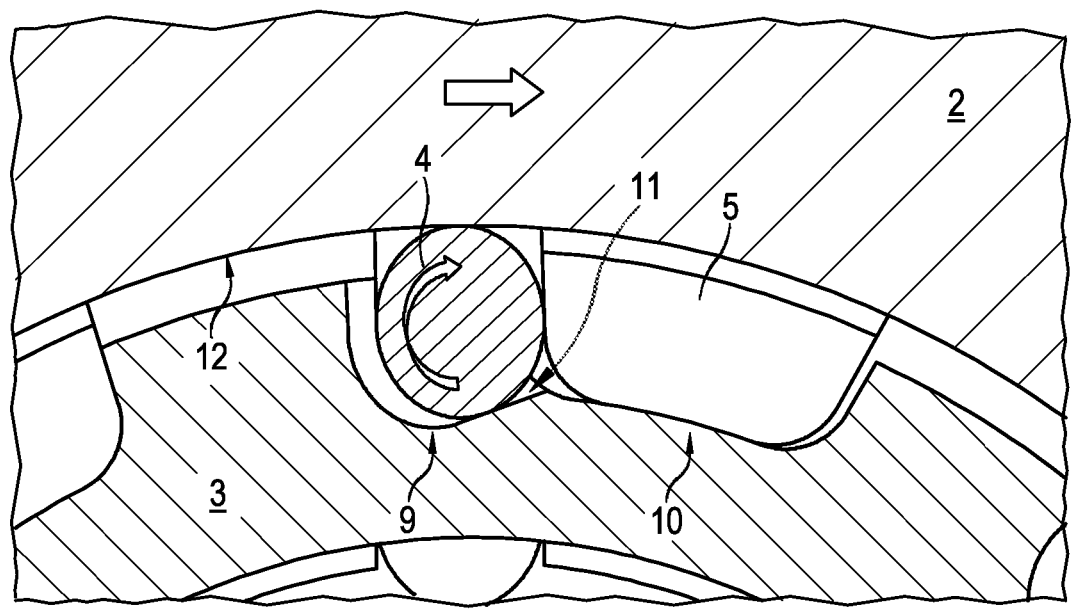
Figure 7:
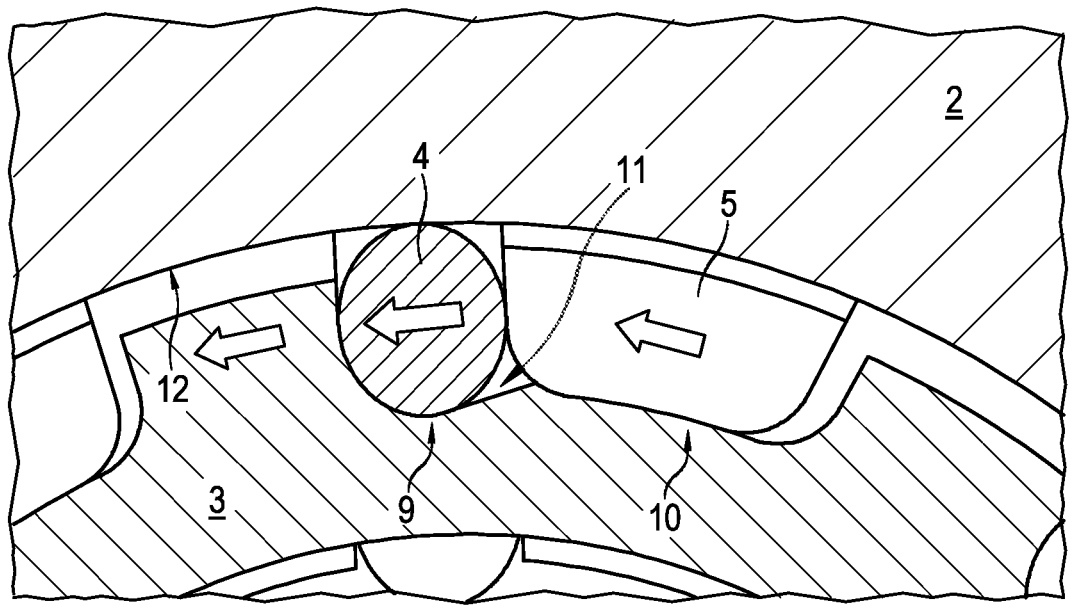
Figure 8:
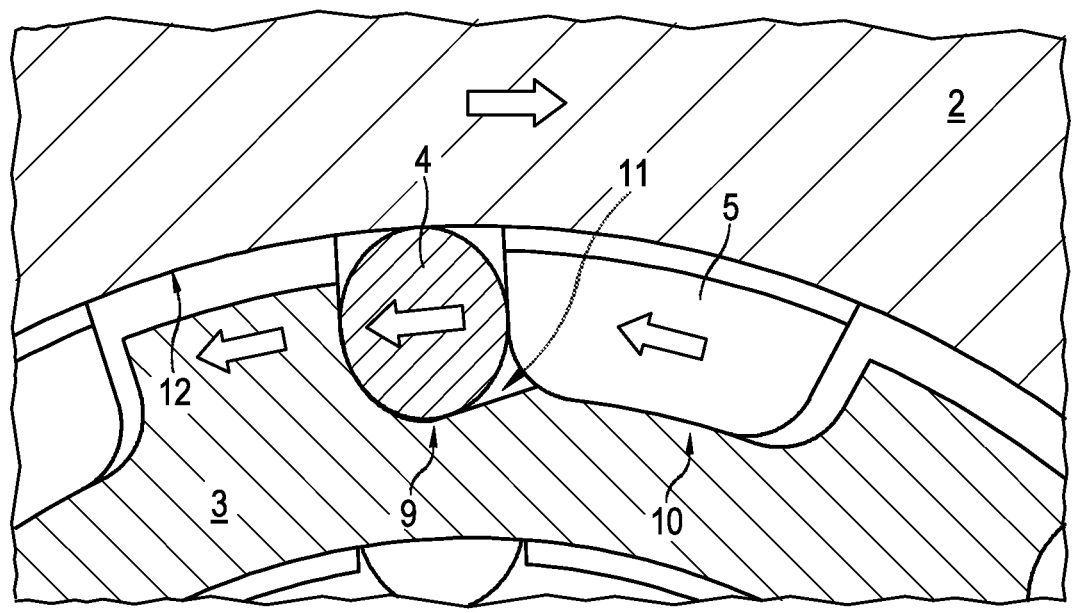
Figure 9:
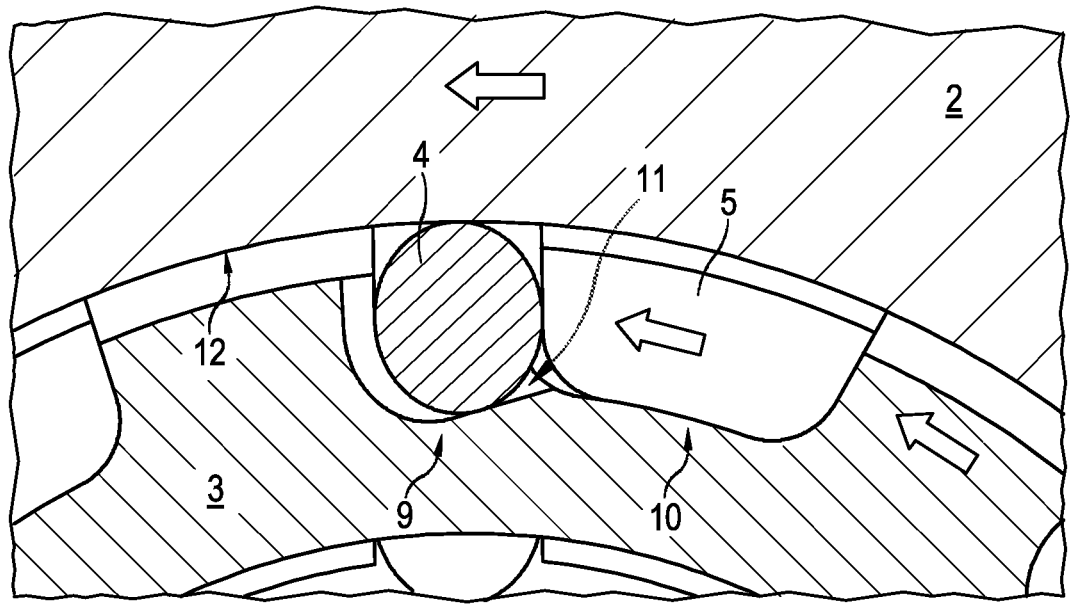
Figure 10:
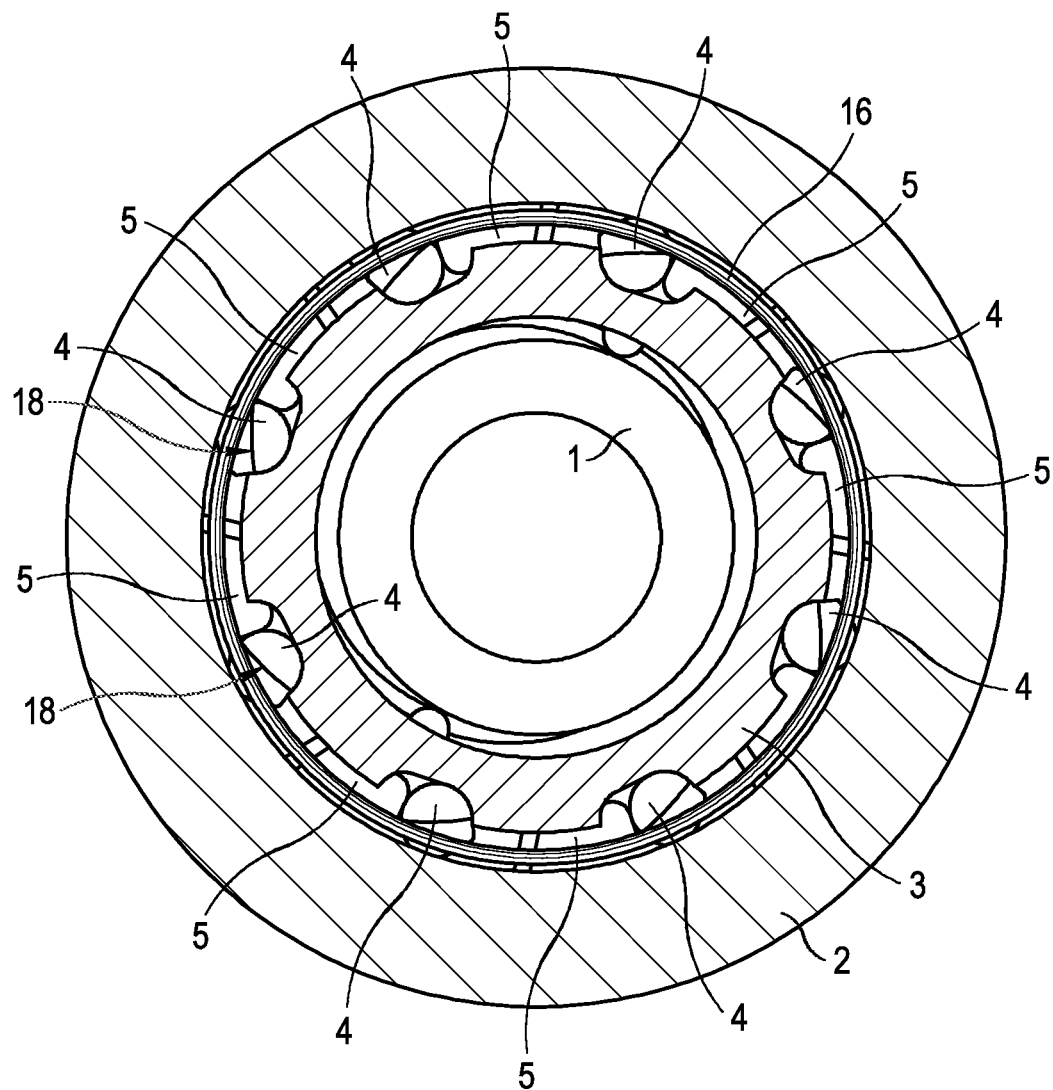
Figure 11:
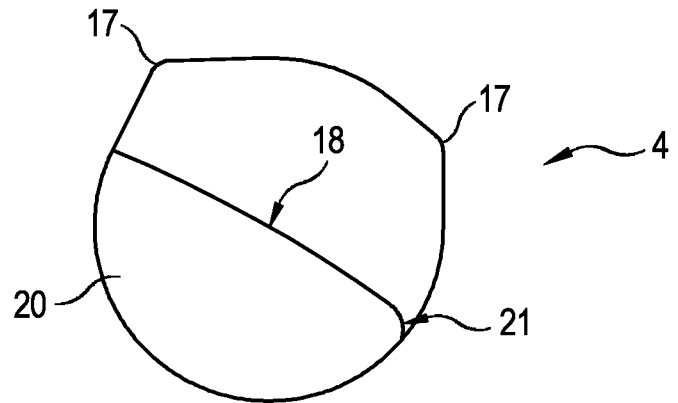
Figure 12:
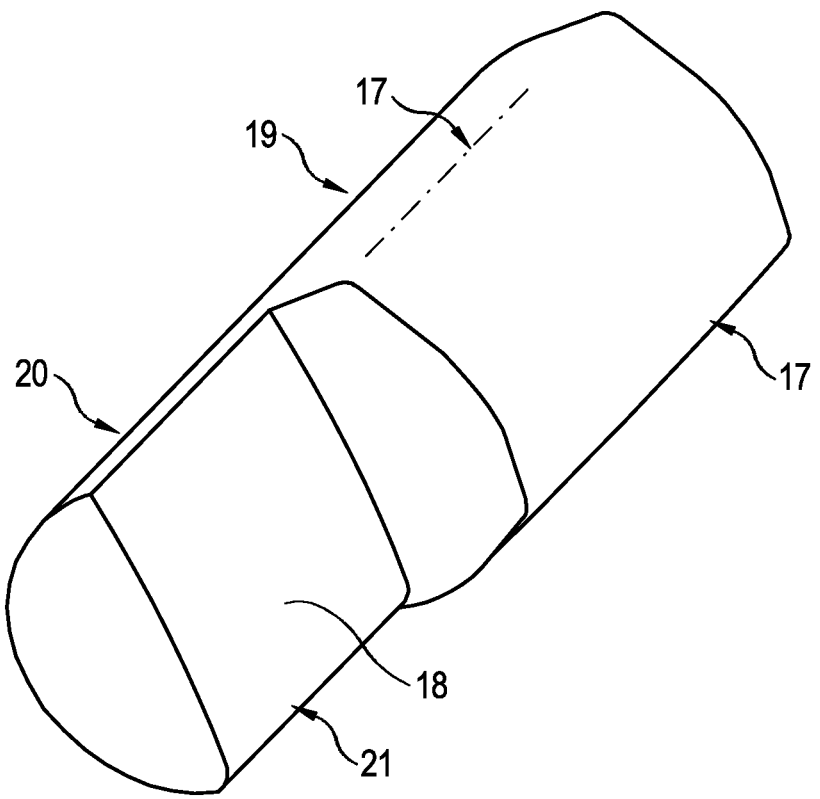

In the drawings:

FIG. 1: shows a partially sectional view of the bottom bracket region of an e-bike with a torque-transmitting means according to the invention according to a first embodiment, FIG. 2: shows a cross-section through the torque-transmitting means according to the invention of FIG. 1 on an axial position of the clamping elements and unlocking elements, FIG. 3: shows the cross-section of FIG. 2 with the auxiliary motor being inactive and the pedal being operated in a forward direction by the user of the e-bike, FIG. 4: shows the cross-section of FIG. 2 when the support by the auxiliary motor is starting, FIG. 5: shows the cross-section of FIG. 2 when the support of the user of the bike by the auxiliary motor is in progress, FIG. 6: shows the cross-section of FIG. 2 in the moment of the stopping of the pedal movement, FIG. 7: shows the cross-section of FIG. 2 with a backward operation of the pedal by the user of the e-bike and with the auxiliary drive being switched off, FIG. 8: shows the cross-section of FIG. 2 with a backward operation of the pedal by the user of the e-bike and a rotation of the second input shaft in the forward direction due to an activation of the auxiliary drive, FIG. 9: shows the cross-section of FIG. 2 when the e-bike is being pushed back, FIG. 10: shows a cross-section through a further embodiment of the torque-transmitting means according to the invention with a tensioning element, FIG. 11: shows a clamping element of the torque-transmitting means according to the invention of FIG. 10 in a detailed view onto the front end of the clamping element, and FIG. 12: shows a perspective view of the clamping element of FIG. 11.

In the following illustrations, equal parts are designated by equal reference numerals. If a figure contains reference numerals which are not explicitly discussed in the pertaining description of the figures, reference is made to previous or following descriptions of the figures.

FIG. 1 shows a partially sectional perspective view of the bottom bracket region of an e-bike with a torque-transmitting arrangement according to a first embodiment. The bottom bracket shaft 1 at which the non-depicted pedal of the e-bike is attached forms a first input shaft of the torque-transmitting arrangement according to the invention. The first input shaft 1 extends through the hollow-cylindrical output shaft 3 of the torque-transmitting arrangement. The hollow-cylindrical output shaft 3 in turn supports the chain ring support 7 at which the chain ring 6 is attached. Via the non-depicted chain, the driving torque prevailing at the output shaft 3 is transmitted to the rear wheel of the e-bike. The torque-transmitting arrangement according to the invention furthermore comprises a second input shaft 2 which is also hollow and radially encloses the output shaft 3. The second input shaft 2 is designed as a crown wheel. It therefore has a conical gear surface into which the pinion 13 of the output shaft of the electric auxiliary motor of the e-bike engages. The second input shaft 2 is thus exclusively driven by the auxiliary drive not further represented. All three shafts, the output shaft 3, the first input shaft 1, and the second input shaft 2, are arranged coaxially with respect to each other and basically mounted to be rotatable with respect to each other. They share the common geometric axis 8 represented in FIG. 1.

The torque arrangement according to the invention is configured such that a torque can be transmitted to the output shaft 3 via both input shafts 1 and 2. The torque-transmitting arrangement according to the invention here has two freewheel functions integrated in one single functional unit. The first freewheel function prevents a user of the e-bike from having to concomitantly rotate the auxiliary motor while pedaling forward if the auxiliary motor is inactive or not switched on. The second freewheel function ensures that the auxiliary motor does not have to be concomitantly rotated counter to the normal directions of rotation if the user of the e-bike pedals backwards without transmitting a torque to the rear wheel. The rear wheel hub is therefore also fitted with a corresponding freewheel.

Below, the functioning of the torque-transmitting arrangement according to the invention will be illustrated. Between the output shaft 3 and the second input shaft 2, a plurality of cylindrical clamping rollers 4 are arranged which, in normal operation, ensure a torque transmission from the second input shaft 2 to the output shaft 3 like a clamp-type lock. The clamping rollers 4 are arranged uniformly distributed across the circumference of the output shaft 3 and are received in corresponding recesses 9 at the outer circumference of the output shaft 3. As FIG. 1 clearly shows, the axes of the clamping rollers 4 are not oriented in parallel to the axis 8 of the torque-transmitting arrangement according to the invention. They are rather at an oblique angle to the common axis 8 of the output shaft 3, the first input shaft 1, and the second input shaft 2. The clamping rollers 4 thus act between clamping surfaces of the output shaft 3 and the second input shaft 2 which are essentially conical.

FIG. 2 shows a cross-section through the torque-transmitting arrangement according to the invention orthogonally to the axis 8 on the axial position of the clamping rollers 4. The clamping surface 12 on the side of the second input shaft 2 is formed by a rotationally symmetric conical surface. The clamping surface 11 on the side of the output shaft is formed by the base of the recess 9 at the outer circumference of the output shaft 3. FIG. 2 clearly shows that the clamping surface 11 increases, seen in the circumferential direction, clockwise or in the drive direction 15, so that the distance between the clamping surface 11 and the clamping surface 12 decreases in the clockwise direction. Also seen in the circumferential direction, next to each recess 9, a second recess 10 is formed in the outer contour of the output shaft 3. Pin-like extensions 5 of the first input shaft 1 engage into the second recesses 10, as shown in FIG. 2. The pin-like extensions 5 are not shown in FIG. 1 for a better overview.

By the engagement of the pin-like extensions 5 into the recesses 10 in the outer contour of the output shaft 3, there basically is a catching engagement between the first input shaft 1 and the output shaft 3. This means that the output shaft 3 basically concomitantly rotates if the first input shaft 1 is rotated into the drive direction of rotation 15 or counter to the drive direction of rotation. However, the catching engagement has a clearance. As FIG. 2 shows, the combined expansion of the first recess 9 and the second recess 10, seen in the circumferential direction, is larger than the combined expansion of the clamping roller 4 and the pin 5 arranged next to it, also seen in the circumferential direction. Thus, there is a clearance 14 represented in FIG. 2 and acting in the circumferential direction.

If the user of the e-bike pedals forward and accordingly in the drive direction of rotation 15, the first input shaft 1 rotates clockwise in the representation in FIG. 3. The pin-like extensions 5 of the first input shaft will abut against the sides of the second recesses 10 located in the right in each of the representations, after they have overcome the clearance 14, so that the output shaft 3 is concomitantly rotated with the first input shaft 1. The clamping rollers 4 remain in the left corner of the corresponding first recess 9 in the process and can freely rotate as is illustrated by the arrow in the clamping roller 4 in FIG. 3.

If now the auxiliary motor is activated, the second input shaft 2 also rotates clockwise as is represented in FIG. 4. To be able to transmit a torque from the auxiliary motor to the output shaft, the second input shaft 2 has to temporarily rotate faster than the output shaft 3. The clamping roller 4 is taken along by this relative movement and rolls along on the increasing clamping surface 11 to the right until it gets jammed between the clamping surface 11 of the output shaft 3 and the clamping surface 12 of the second output shaft, and a self-locking occurs thereby. This condition is shown in FIG. 5. Now, a torque is transmitted to the output shaft 3 both via the first input shaft 1 and the second input shaft 2.

If the user of the e-bike opposes the pedals against the torque of the second input shaft 2, the pin-like extensions 5 exert a force acting counterclockwise onto the clamping rollers 4. This condition is shown in FIG. 6. When the static friction of the clamping rollers is overcome, these begin again to rotate or slide. The frictional contact between the second input shaft and the output shaft is then interrupted. The second input shaft freely rotates. This can be the case, for example, if the auxiliary motor accelerates faster than the driver wishes to. The e-bike can of course have a corresponding torque sensor which in this case would measure a negative torque which would lead to an inactivation of the auxiliary motor.

FIG. 7 shows the behavior of the torque-transmitting arrangement according to the invention when the driver of the e-bike pedals backwards. The pin-like extension 5 pushes the clamping roller of 4 counterclockwise in the process until the clamping roller is jammed between the pin-like extension 5 and the left side of the first recess 9. The torque is now transmitted counterclockwise from the first input shaft or the pin-like extension 5 via the clamping roller 4 to the output shaft 3. The output shaft 3 rotates with the first input shaft counterclockwise. The frictional contact between the output shaft and the second input shaft, however, is cancelled, so that the auxiliary motor does not have to be concomitantly rotated during this backward movement of the pedal. As FIG. 8 shows, an activation of the auxiliary motor in the drive direction of rotation, which causes a clockwise rotation of the second input shaft 2, has no influence on the clamping roller 4 and on the backward movement of the first input shaft 1 and the output shaft 3.

FIG. 9 finally shows the behavior when the e-bike is pushed backwards. In this case, the output shaft 3 rotates counterclockwise and in the process takes along the pin-like extensions 5 of the first input shaft in its movement. By a relative rotation between the output shaft 3 and the second input shaft 2, the clamping roller 4 rolls along on the first clamping surface 11 to the right into the locking position in which a self-locking between the clamping roller 4 and the output shaft 3 and the second input shaft 2 occurs. When the e-bike is being pushed back, the auxiliary motor is therefore concomitantly rotated.

FIG. 10 shows a cross-section through a further embodiment of the torque-transmitting means according to the invention. The torque-transmitting means is basically of the same design as the torque-transmitting means according to the embodiment of FIGS. 1 to 9. In the embodiment shown in FIG. 10, the torque-transmitting means additionally comprises a tensioning element 16 which is designed to support the clamping elements 4 during the transfer into the locking position. The tensioning element 16 has an annular design and abuts against corresponding support surfaces 18 of the clamping elements 4. As FIGS. 11 and 12 show, the support surface 18 is embodied at a projection 20 axially protruding from a basic body 19 of the clamping element 4. The tensioning element has an elastic design so that a tensioning force is generated by the tensioning element. By the resting of the tensioning element 16 at a point of the support surface 18, thus a force or a torque, respectively, onto the clamping element 4 can be generated. By the torque, the clamping elements 4 are supported in the movement or transfer into the locking position. The tensioning element 16 can be made, for example, of an elastic material, such as gum or rubber, by which the tensioning force is generated. The tensioning element 16 can alternatively be made of spring wire, for example. By spiraling a wire, a worm spring is created which can also generate the tensioning force. The clamping elements 4 of the clamp-type lock must be well lubricated. Thereby, in the embodiment according to FIGS. 1 to 9, the clamping elements 4 might remain adhered in the released position and do not roll or slide or are transferred into the locking position by the relative movement between the second input shaft 2 and the output shaft 3 and the centrifugal force and/or the force of gravity. By the tensioning element 16 of the torque-transmitting means according to the second embodiment of FIG. 10, the clamping elements 4 are supported during the transfer from the released position into the unlocking position, so that all the clamping elements are reliably and quickly brought into the locking position.

The projection 20 with the support surface 18 protrudes from the basic body 19 of the clamping element 4 by about 1 mm to 10 mm, preferably 2 mm to 5 mm, so that the tensioning element 16 can well rest on it and not too much installation space for the projection 20 is required in the clamp-type lock. The support surface 18 extends radially approximately in a straight line from one side of the circumference of the clamping element 4 to the other side of the circumference. Preferably, the support surface 18 here approximately extends through the center point with a cross-section extending perpendicularly to the longitudinal axis of the clamping element 4. Thereby, by the support surface 18, a preferably large torque can be generated at the clamping element 4. The support surface 18 has a curvature 21 near the outer circumference of the clamping element 4. By the curvature 21, the tensioning element 16 is mechanically less loaded when it rests on the support surface 18 than in a case where the tensioning element 16 would rest on an acute edge.

The tensioning element 16 shown in FIG. 10 generates a tensioning force directed towards the common axis 8. In this arrangement, the tensioning element 16 should rest on a region of the clamping element 4 near the axis. The region near the axis is that region of the clamping elements 4 which is closer to the common axis 8 of the three shafts 1, 2, and 3 seen in FIG. 1. The projection 20 thus forms the region near the axis.

It is also possible to generate, by a tensioning element, a tensioning force to the outside, away from the common axis 8. In such a non-depicted arrangement, the tensioning element should rest opposite a region of the clamping elements remote from the axis.

As FIG. 12 shows, the clamping element 4 comprises a basic body with a circular cross-section and two bulgings 17. The bulgings 17 enlarge the circumference of the clamping element 4 like two cams, whereby both the power transmission and the positioning or orientation of the clamping element 4 between the second input shaft 2 and the output shaft 3 are improved.

LIST OF REFERENCE NUMERALS 1 first input shaft
2 second input shaft
3 output shaft
4 clamping element
5 unlocking element
6 chain ring
7 chain ring support
8 axis
9 first recess
10 second recess
11 first clamping surface
12 second clamping surface
13 pinion
14 circumferential clearance
15 drive direction of rotation
16 tensioning element
17 bulging
18 support surface
19 basic body
20 projection
21 curvature

The invention claimed is:

1. A torque-transmitting arrangement for a drive train of a muscle-power-operated vehicle with an auxiliary motor, the torque transmitting arrangement comprising:
an output shaft;
a first input shaft for transmission of a torque generated by muscle power to the output shaft,
a second input shaft for the transmission of a torque generated by an auxiliary motor to the output shaft;
a freewheel function configured to prevent a user of the muscle-power-operated vehicle from having to concomitantly rotate the auxiliary motor when the auxiliary motor is inactive; and
a mechanical clutch configured to transmit a torque from the second input shaft to the output shaft, if, at the first input shaft, a torque prevails which acts in a drive direction of rotation on the output shaft, and to transmit no torque from the second input shaft to the output shaft if, at the first input shaft, a torque prevails which acts on the output shaft counter to the drive direction of rotation.

2. The torque-transmitting arrangement according to claim 1, wherein the mechanical clutch is a clamp-type lock clutch which is operable without any electric power supply.

3. The torque-transmitting arrangement according to claim 2, the clamp-type lock clamping element comprising:
a plurality of clamping elements which are arranged distributed in a circumferential direction.

4. The torque-transmitting arrangement according to claim 3, wherein the clamp-type lock clamping element comprises:
an annular tensioning element which is designed and configured to support the clamping elements during a transfer to the locking position.

5. The torque-transmitting arrangement according to claim 1, wherein the output shaft, the first input shaft, and the second input shaft are arranged coaxially with respect to each other and mounted to be rotatable with respect to each other, the torque-transmitting arrangement comprising:
between the first input shaft and the output shaft, a catching engagement with a clearance to permit, within a certain circumferential clearance, a relative rotation between the first input shaft and the output shaft; and
wherein at least one clamp-type lock clamping element is arranged between the second input shaft and the output shaft such that the clamping element will be in any case in a released position or is-brought into the released position if the output shaft is rotated by the first input shaft in a drive direction of rotation, and the second input shaft either does not rotate or rotates more slowly in the drive direction of rotation than the output shaft and the first input shaft,
wherein the clamping element is configured to be transferred from the released position to a locking position by a relative rotation between the output shaft and the second input shaft, if the second input shaft temporarily rotates faster in the drive direction of rotation than the output shaft, so that a catching engagement between the second input shaft and the output shaft will be generated, wherein the clamping element in any case remains in the locking position when a torque acting in the drive direction of rotation is transmitted to the output shaft via the first input shaft and via the second input shaft, and
wherein the first input shaft comprises:
an unlocking element which is configured to move the clamping element in any case actively from the locking position into the released position if the first input shaft rotates against the drive direction of rotation within the circumferential clearance existing between the first input shaft and the output shaft relative to the output shaft.

6. The torque-transmitting arrangement according to claim 5, wherein the clamping element is a rolling element which is arranged between a first clamping surface of the output shaft and a second clamping surface of the second input shaft, wherein a distance between the first clamping surface and the second clamping surface decreases, when viewed in the drive direction of rotation, such that in the locked position of the clamping element, there is a self-locking between the clamping element and the first clamping surface and the second clamping surface.

7. The torque-transmitting arrangement according to claim 6, wherein the clamping element is a clamping roller.

8. The torque-transmitting arrangement according to claim 6, wherein the clamping element has a cylindrical or conical design configuration.

9. The torque-transmitting arrangement according to claim 8, wherein the clamping element has, in a section perpendicular to the longitudinal axis of the clamping element, a circular cross-section or a circular cross-section with at least one bulging.

10. The torque-transmitting arrangement according to claim 6, wherein an axis of rotation of the clamping element is parallel to a common axis of the output shaft, the first input shaft, and the second input shaft.

11. The torque-transmitting arrangement according to claim 4, wherein the first clamping surface and the second clamping surface are formed by conical surfaces, wherein a central radius of the second clamping surface is constant across a total circumference of the second input shaft, and wherein a central radius of the first clamping surface varies, when viewed in a circumferential direction.

12. The torque-transmitting arrangement according to claim 6, wherein the clamping element is received in a first recess of the output shaft, wherein the first clamping surface is formed by a partial surface of the first recess.

13. The torque-transmitting arrangement according to claim 12, wherein a second recess following the first recess is formed in the output shaft, when viewed in the drive direction of rotation, wherein the unlocking element of the first input shaft is a pin which engages into the second recess, wherein in the drive direction of rotation, by the engagement between the pin and the second recess, the catching engagement between the first input shaft and the output shaft will be created, and wherein the circumferential clearance between the first input shaft and the output shaft is given by a combined expansion of the first recess and the second recess, when viewed in the circumferential direction, being larger than a combined expansion of the clamping element and the pin, when viewed in the circumferential direction.

14. The torque-transmitting arrangement according to claim 5, wherein the output shaft, the first input shaft, and the second input shaft are arranged coaxially with respect to each other and mounted to be rotatable with respect to each other, the torque-transmitting arrangement comprising:

between the first input shaft and the output shaft, a catching engagement with a clearance to permit, within a certain circumferential clearance, a relative rotation between the first input shaft and the output shaft; and at least one clamp-type lock clamping element arranged between the second input shaft and the output shaft such that the clamping element will be in any case in a released position or brought into the released position if the output shaft is rotated by the first input shaft in a drive direction of rotation, and the second input shaft either does not rotate or rotates more slowly in the drive direction of rotation than the output shaft and the first input shaft, wherein the clamping element is configured to be transferred from the released position to a locking position by a relative rotation between the output shaft and the second input shaft, if the second input shaft temporarily rotates faster in the drive direction of rotation than the output shaft, so that a catching engagement between the second input shaft and the output shaft will be generated, wherein the clamping element in any case remains in the locking position when a torque acting in the drive direction of rotation is transmitted to the output shaft via the first input shaft and via the second input shaft, and wherein the first input shaft comprises:

an unlocking element which is configured to move the clamping element in any case actively from the locking position into the released position if the first input shaft rotates against the drive direction of rotation within the circumferential clearance existing between the first input shaft and the output shaft relative to the output shaft.

15. The torque-transmitting arrangement according to claim 14, wherein the clamping element is a rolling element which is arranged between a first clamping surface of the output shaft and a second clamping surface of the second input shaft, wherein a distance between the first clamping surface and the second clamping surface decreases, when viewed in the drive direction of rotation, such that in the locked position of the clamping element, there is a self-locking between the clamping element and the first clamping surface and the second clamping surface.

16. The torque-transmitting arrangement according to claim 15, wherein the clamping element is a clamping roller.

17. The torque-transmitting arrangement according to claim 1, wherein the second input shaft coaxially encloses the output shaft.

18. The torque-transmitting arrangement according to claim 17, wherein the second input shaft is designed and configured as a crown wheel.

19. The torque-transmitting arrangement according to claim 1, wherein the first input shaft extends through the output shaft.

20. A bike comprising:

the torque transmitting arrangement according to claim 1, wherein the auxiliary motor is configured as a mid-motor and is coupled to the second input shaft.

* * * * *

UNITED STATES PATENT AND TRADEMARK OFFICE
CERTIFICATE OF CORRECTION

PATENT NO. : 12,065,216 B2
APPLICATION NO. : 17/593884
DATED : August 20, 2024
INVENTOR(S) : Ernst Von Lehmann It is certified that error appears in the above-identified patent and that said Letters Patent is hereby corrected as shown below:

In the Claims

Claim 14 the phrase: "The torque-transmitting arrangement according to claim 5, wherein...." (Column 11: Lines 47-48). Should read: "The torque-transmitting arrangement according to claim 2, wherein....".

Signed and Sealed this
Eighth Day of October, 2024

Katherine Kelly Vidal
*Director of the United States Patent and Trademark Office*